United States Patent
Tarui et al.

(10) Patent No.: US 6,845,683 B2
(45) Date of Patent: Jan. 25, 2005

(54) SHIFTING-TRANSFER MECHANISM (75) Inventors: Jun Tarui, Kariya (JP); Hideo Hattori, Chiryu (JP); Kiyoshi Kimura, Kariya (JP)

(73) Assignee: Denso Corporation, Kariya (JP)

( * ) Notice: Subject to any disclaimer, the term of this patent is extended or adjusted under 35 U.S.C. 154(b) by 16 days.

(21) Appl. No.: 10/098,156

(22) Filed: Mar. 13, 2002

(65) Prior Publication Data

US 2002/0112554 A1 Aug. 22, 2002

Related U.S. Application Data (63) Continuation-in-part of application No. 09/672,824, filed on Sep. 29, 2000, now abandoned.

(30) Foreign Application Priority Data

Sep. 30, 1999 (JP) .......................................... 11-278814
Mar. 14, 2001 (JP) ....................................... 2001-072605

(51) Int. Cl.[7] ............................................. F16H 59/00
(52) U.S. Cl. ....................................... 74/335; 477/907
(58) Field of Search .......................... 477/907; 74/335, 74/337, 473, 473.12, 473.19, 473.36; 180/247, 248

(56) References Cited

U.S. PATENT DOCUMENTS

| | | | | |
|---|---|---|---|---|
| 4,846,010 A | | 7/1989 | Fujikawa et al. | |
| 4,916,263 A | | 4/1990 | Ichigo | |
| 5,005,663 A | * | 4/1991 | Niide et al. | ................. 180/247 |
| 5,199,325 A | | 4/1993 | Reuter et al. | |
| 5,307,013 A | * | 4/1994 | Santos et al. | ................. 74/335 |
| 5,704,867 A | * | 1/1998 | Bowen | ....................... 180/247 |
| 5,754,970 A | * | 5/1998 | Takasaki et al. | ............ 180/247 |
| 5,867,092 A | | 2/1999 | Vogt | |
| 6,071,207 A | * | 6/2000 | Stephens et al. | ............ 475/204 |
| 6,140,916 A | | 10/2000 | Stollsteimer et al. | |
| 6,155,126 A | | 12/2000 | Vogt et al. | |
| 6,211,794 B1 | | 4/2001 | DeSoto | |
| 6,315,073 B1 | | 11/2001 | Nonaka | |

FOREIGN PATENT DOCUMENTS

| | | | | |
|---|---|---|---|---|
| JP | 63-34348 | | 2/1988 | |
| JP | 63-34349 | | 2/1988 | |
| JP | 401195135 A | * | 8/1988 | ................. 180/247 |
| JP | 402099426 A | * | 4/1990 | ................. 180/247 |
| JP | 7-179133 | | 7/1995 | |
| JP | 2000-145935 | | 5/2000 | |

\* cited by examiner

*Primary Examiner*—Dirk Wright
(74) *Attorney, Agent, or Firm*—Harness, Dickey & Pierce, PLC (57) ABSTRACT

A shifting mechanism includes a limit switch that sends an open-close signal of the switch contacts SW1, SW2, SW3 and SW4 out to a control mechanism according to a 2H-4H-N-4L shifting sequence. The switch contacts SW1 and SW2 detect the position of a slider 4H which is moved by a thrust actuator, during shifting in the range of 4H engagement to the range of N engagement. Therefore, if one of the switch contacts SW1 and SW2 is faulty, the other switch detects shifting between 4H and N. This prevents shifting into N over 4H, thereby preventing malfunction of the thrust actuator resulting from a faulty switch contact SW1 or SW2. This also avoids potential difficulties in vehicle control due to shifting characteristics and permits the maintaining of controlled driving.

6 Claims, 5 Drawing Sheets

SHIFTING-TRANSFER MECHANISM

CROSS-REFERENCE TO RELATED APPLICATIONS

The present invention is a Continuation-in-Part of U.S. patent application Ser. No. 09/672,824, filed Sep. 29, 2000, now abandoned which is based on Japanese Patent Application No. Hei. 11-278814, filed Sep. 30, 1999; additionally, portions of the present application are also based on Japanese Patent Application No. 2001-72605, filed Mar. 14, 2001, the contents of which are incorporated herein by reference.

BACKGROUND OF THE INVENTION

1. Field of the Invention

The present invention relates to a shifting-transfer mechanism and, more particularly, to a shifting-transfer mechanism suitable for transferring between two-heel drive and four-wheel drive in a four-wheel drive vehicle and also for changing between high- and low-speed gear ratios of a power train from a transmission to a drive axle.

2. Description of Related Art

As a 2WD/4WD transfer mechanism for transferring from two-wheel drive to four-wheel drive in, for instance, a four-wheel drive vehicle, a transfer mechanism is known where transfer between four-wheel drive and two-wheel drive is made by connecting and disconnecting a slider with splines. Here, splines are formed on the front and/or rear axle shaft. Normally, during two wheel drive mode, only one of the axles acts as the drive axle, but during four wheel drive mode, both axles are normally constantly or intermittently driven by engine power via the transmission.

Also in HIGH/LOW shifting mechanisms for changing between a high and low speed gear ratio for a power train from the transmission to the drive axle, mechanisms are known where the gear ratio of the power train from the transmission to the drive axle is set to either HIGH range or LOW range by connecting the drive axle splines to the output shaft splines of the transmission. Alternatively, such a device mates the drive axle splines in such a way so that the torque is transmitted from the transmission through a speed changing mechanism. This HIGH/LOW shifting is accomplished by moving the slider, engageable with the splines, along the drive axle axis. The HIGH/LOW shifting mechanism is designed to change the gear ratio according to a control command from the driver during four-wheel drive of the motor vehicle. Generally during two-wheel drive, the gear ratio is locked in HIGH to maximize fuel economy.

A thrust actuator has been used for driving the 2WD/4WD transfer mechanism and the HIGH/LOW shifting mechanism as stated above. This thrust actuator slides the slider from being connected to the splines to being disconnected (slid in an opposite direction) from the splines. Here, a shift fork, formed on a fork shaft, changes motor rotation into a linear motion along the axial direction of the rod. Then, the fork shaft, locked on the forward end of the rod, is shifted.

Recently, some vehicles with part-time four-wheel drive systems employ a shifting mechanism where a single actuator is used to make a 2H-4H-N-4L shift. Such a shift is to two-wheel drive high speed (2H), four-wheel drive high speed (4H), neutral position (N) and four-wheel drive low speed (4L). This mechanism has fewer components than one having a plurality of actuators. Accordingly, this device is mountable in a narrow mounting space, thereby reducing manufacturing cost.

With a single actuator for 2H-4H-N-4L shifting, the vehicle can safely be driven essentially without changing vehicle speed when a 2H-4H shift is made while moving. However, if a 4H-N-4L shift is made during driving, the vehicle speed will suddenly change because there is one position in the shift pattern where the driving power decreases. Normally, therefore, the 4H-N-4L shift is done when the vehicle is stopped. However, if the 2H-4H shift is made during driving, failing to detect the 4H position and further operating the actuator in the range of N or 4L may decrease driving power and cause a change in vehicle speed.

However, a method for detecting a gear position switch failure is disclosed in JP-A No. S63-34349. Here, each gear of an automatic transmission is shifted by a gear shifting means. A gear position is detected by a gear position switch that determines a failure of the gear position switch to detect a target gear position when no shift is completed, even by a retry. This failure method detection is suitable for determining a failure of the position detecting switch in movement between two points.

However, in the shifting mechanism having a single actuator for performing the 2H-4H-N-4L shift, it is necessary to stop at a point between a 4H-N shift. If the method disclosed in JP-A No. S63-34349 is adopted, the actuator may be driven past the target position to the range of N or 4L, when the target is set at a position between 4H-N, potentially resulting in decreased vehicle control.

There is a mechanism disclosed in Japanese patent application No. 11-278814. In this mechanism, four independent contact-type position detecting switches detect switching positions to drive an actuator.

SUMMARY OF THE INVENTION

It is therefore an object of the present invention to provide a position-detecting mechanism that is capable of detecting on- or off-failures of position detecting switches even in the situation where both switches are faulty at the same time. This detection will permit an operator to avoid decreased vehicle control or a state of lessened vehicle control and maintain or improve an acceptable level of vehicle control.

A shifting-transfer mechanism is normally used for shifting to 2WD high speed, 4WD high speed, a neutral position, and 4WD low speed in a vehicle equipped with a part-time four-wheel drive system and a power transmitting means driven by an internal-combustion engine. The shifting-transfer mechanism has an actuator for moving a drive object into connection with an output shaft of the power transmitting means, a first position detecting switch for detecting the position of the drive object within any one of the range of engagement or non-engagement of the 2WD high speed, the 4WD high speed, the neutral position, or the 4WD low speed. The shifting-transfer mechanism also has a second position detecting switch operating independently of the first position detecting switch for detecting the position of the drive object within any one of the range of engagement or non-engagement of the 2WD high speed, the 4WD high speed, the neutral position, or the 4WD low speed. Additionally, on/off switching patterns of the first and the second position detecting switches differ from each other within any one of the range of engagement or non-engagement of the 2WD high speed, the 4WD high speed, the neutral position, or the 4WD low speed.

Since, on/off patterns of the two position detecting switches are different from each other, continuous driving of the actuator resulting from a failure of position detection due to a switch contact failure can be prevented. This is true even when both detecting switches have on- or off-failures at the same time since on/off patterns of any one of them changes. Moreover, on/off patterns of the other position detecting switch remains the same, therefore, simultaneous failures can be determined. By controlling the actuator so that it moves to the further position due to simultaneous on- or off-failures, improved vehicle control can be maintained.

A shifting-transfer mechanism may be configured so that any one of either the first position detecting switch and the second position detecting switch can be switched on or off within the range of engagement of 4WD high speed. An on/off switching pattern of the other position detecting switch differs from that of said position detecting switch around a position where on/off is altered by said position detecting switch.

Therefore, it is possible to detect a gear position within the range of engagement of the 4WD high speed as well as to determine which position switch is faulty, when any one of the position detecting switches becomes faulty. Even when those switches have on- or off-failures at the same time, the on- or off-failures can be detected by any one of the position detecting switches. This is because switching patterns of those switches are different from each other.

Regarding a shifting-transfer mechanism of an embodiment of the present invention, it is a shift-transfer mechanism used in a vehicle with a part-time four-wheel drive system. The vehicle is equipped with a power transmitting means driven by an internal combustion engine, wherein the 2WD high speed, 4WD high speed, neutral position, and 4WD low speed are mechanically arranged in order of mention. The shifting-transfer mechanism comprises an actuator for moving a drive object into connection with an output shaft of the power transmitting means, a first position detecting switch for detecting the position of the drive object within any one of the range of engagement or non-engagement of the 2WD high speed, the 4WD high speed, the neutral position, or the 4WD low speed. The shifting-transfer mechanism also comprises a second position detecting switch operating independently of the first position detecting switch, for detecting the position of the drive object within any one of the range of engagement or non-engagement of the 2WD high speed, the 4WD high speed, the neutral position, or the 4WD low speed. Additionally, a third position detecting switch is present and operates independently of the first and the second position detecting switches and detects the position of the drive object within any one of the range of engagement or non-engagement of the 2WD high speed, the 4WD high speed, the neutral position, or the 4WD low speed. Furthermore, a fourth position detecting switch operating independently of the first, the second, and the third position detecting switches is present for detecting the position of the drive object within any one of the range of engagement or non-engagement of the 2WD high speed, the 4WD high speed, the neutral position, or the 4WD low speed. Also, the fourth position detecting switch detects switching patterns of any two of said position detecting switches utilized for detecting the position of the drive object within at least any one of the range of engagement of the 2WD high speed, non-engagement between the 2WD high speed and the 4WD high speed, engagement of the 4WD high speed, non-engagement between the 4WD high speed and the neutral speed, engagement of the neutral position, non-engagement between the neutral speed and the 4WD low speed, or engagement of the 4WD low speed.

When detecting a position of the drive object by two of the four position detecting switches, on/off patterns of the two position detecting switches are different from each other. Therefore, continuous driving of the actuator resulting from a failure of position detection due to a switch contact failure can be prevented. This is true even when both switches have on- or off-failures at the same time since on/off patterns of any one of them changes. Moreover, on/off patterns of the other position detecting switch remains the same, therefore, the simultaneous failures can be determined. By controlling the actuator to move to the further position due to the simultaneous on- or off-failures, difficult vehicle operation can be prevented.

A shifting-transfer mechanism may also comprise a means for deciding a failure of the first, second, third and fourth position detecting switches by comparing a predicted switching condition based on historic records of the first, second, third and fourth position detecting switches with an actual switching condition of these switches. It is, therefore, possible to localize a defective position detecting switch. Therefore, it is possible to shift while disregarding the defective position detecting switch.

The present invention provides a 2H-4H-N-4L shifting mechanism in which the first position detecting switch and the second position detecting switch, operating independently of the first switch, detects the position of a drive object to be moved by the actuator during a shift from the range of 4H engagement to the range of N engagement. Therefore, if the first or second position detecting switch is faulty, the remaining non-faulty switch can detect a shift between 4H and N. This prevents a fall into N over 4H. Therefore, it is possible to prevent actuator malfunction resulting from a failure of the position detecting switch and accordingly to avoid occurrence of hard vehicle operation control. "To operate independently," stated above, means by that in case one position detecting switch is faulty, the other switch can operate properly.

In another aspect of the invention, the shifting mechanism mechanically shifts 2H-4H-N-4L in order of mention. The third fourth position detecting switch, operating independently of the third position detecting switch, detects the position of a drive object moved by the actuator within the range of 2H engagement, range of non-engagement between 2H and 4H, range of 4H engagement, range of non-engagement between 4H and N, range of N engagement, range of non-engagement between N and 4L, and range of 4L engagement. Therefore, the presence or absence of a failure of the first, second, third and fourth position detecting switches is determined by checking the detection order of these switches.

In another aspect of the present invention, a means for deciding a failure of the first, second, third and fourth position detecting switches is accomplished by comparing a switching condition predicted based on historic records of the first, second, third and fourth position detecting switches with an actual switching condition of these switches. It is, therefore, possible to localize a defective position detecting switch, and to shift while disregarding the defective position detecting switch.

In another aspect of the present invention, when the first, second, third or fourth position detecting switch fails, the actuator shifts to 2H or to 4L to increase the displacement time for moving the object. Therefore, a shift to 4H or to N is prohibited, to thereby ensure proper shifting to 2H or to 4H. Consequently, driving can continue even during a position detecting switch failure.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DESCRIPTION OF THE PREFERRED EMBODIMENTS

Figure 3:
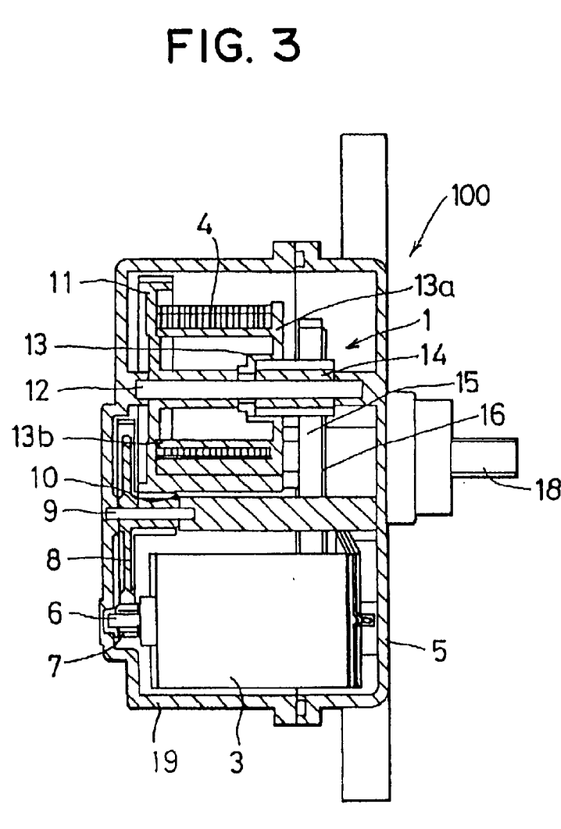
FIG. 3 is a cross-sectional view taken along line III—III of FIG. 2 of a shifting transfer mechanism according to the present invention.
Figure 4:
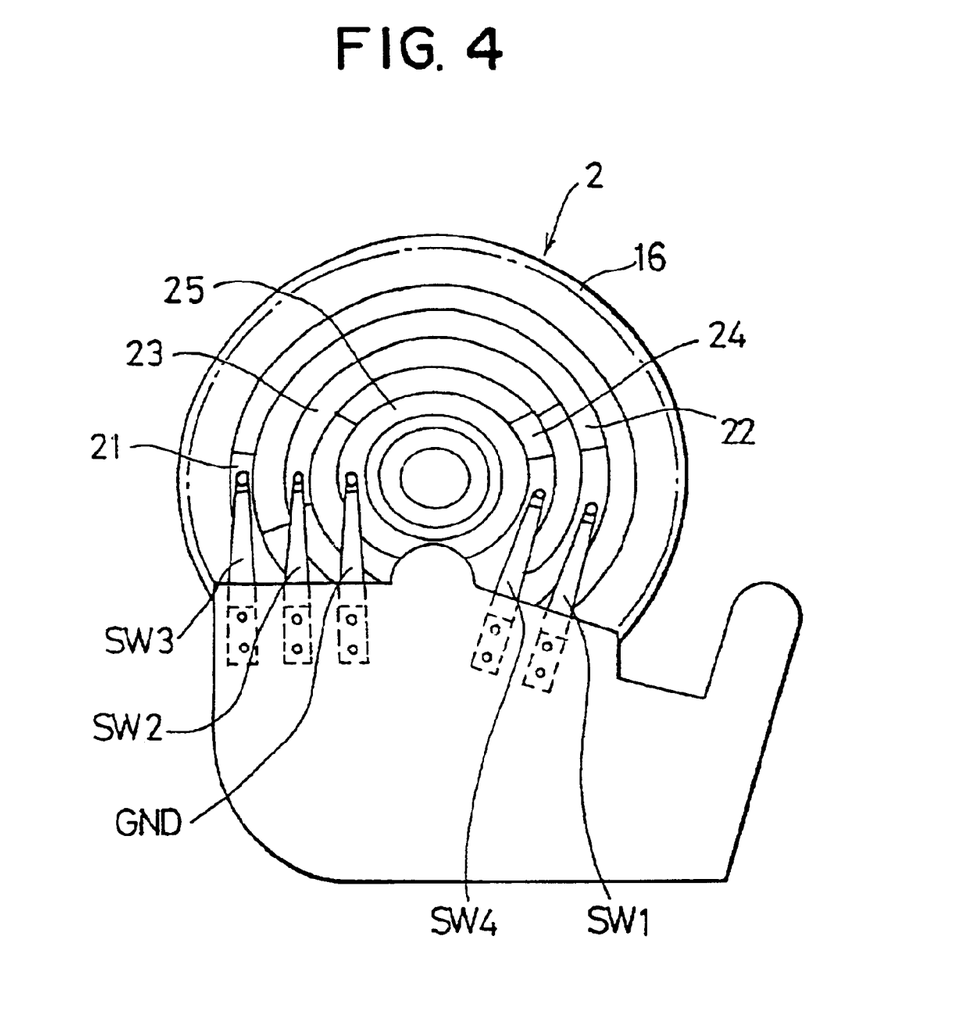
FIG. 4 is a plan view showing a limit switch of a shifting transfer mechanism according to the present invention.
Figure 5:
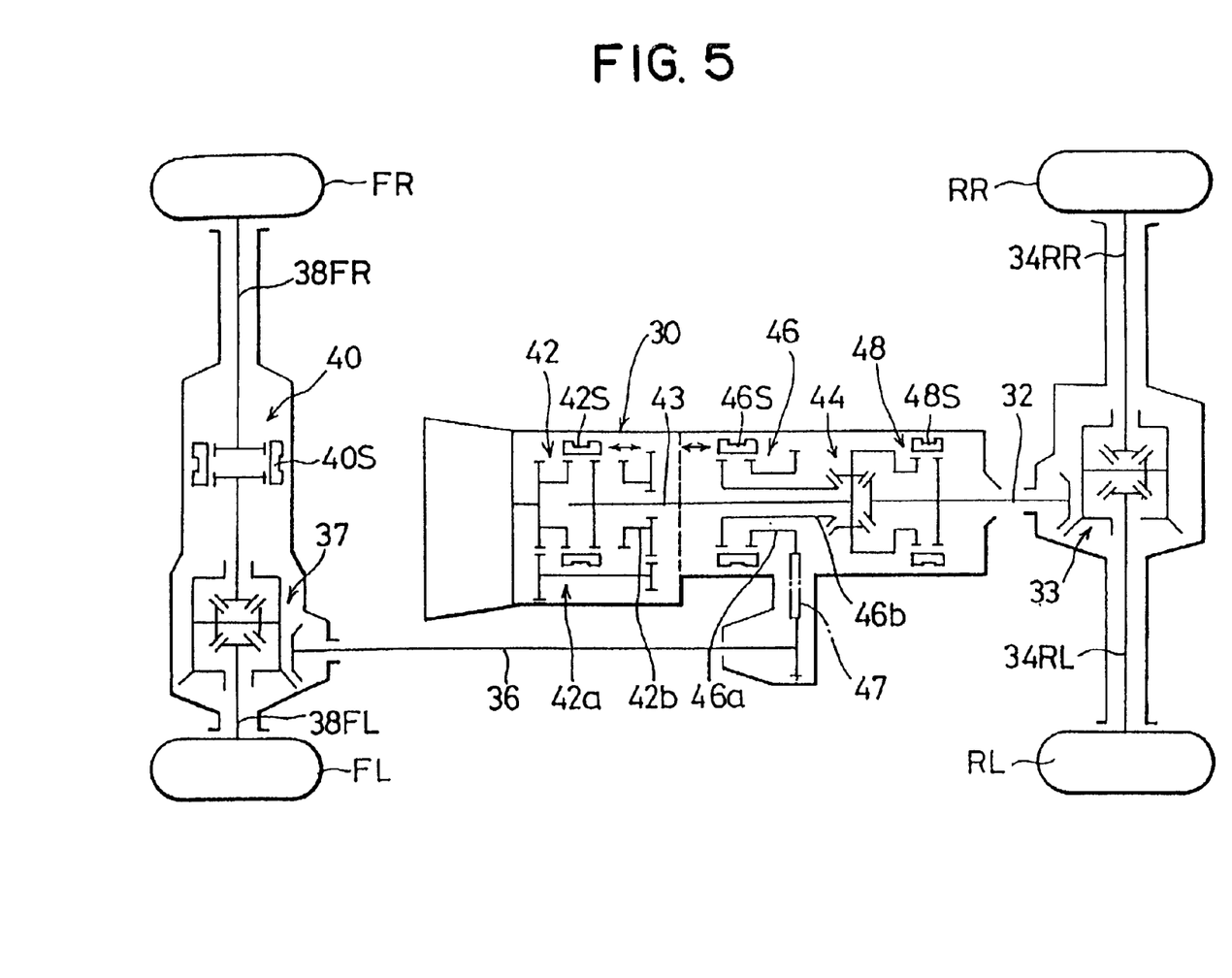
FIG. 5 is a schematic view showing the general construction of a power transmission system on a four-wheel drive vehicle for a shifting transfer mechanism according to the present invention.

Referring to FIGS. 1 through 5, a first embodiment of the shifting mechanism according to the present invention will be explained. FIG. 5 is a schematic block diagram showing the general construction of a power transmission system on a four-wheel drive vehicle for a transfer shifting mechanism according to the present invention.

As shown in FIG. 5, the four-wheel drive vehicle of the present embodiment is equipped with a transfer mechanism 30 for power transmission from the output of an internal-combustion engine (not shown) to the transmission TM. An output shaft protruding from the transfer mechanism 30 to the rear of the motor vehicle reaches the right and left rear wheels, RR and RL respectively, through a rear propeller or drive shaft 32, a rear differential gear 33, and rear drive axles 34RL and 34RR which drive the right and left rear wheels RL and RR, respectively. On the other hand, the output shaft protruding from the transfer mechanism 30 to the front of the motor vehicle reaches the right and left front wheels FR and FL through a front propeller or drive shaft 36, a front differential gear 37, and front drive axles 38FL and 38FR which drive the right and left front wheels FR and FL, respectively. The front drive axle 38FR for the front right wheel FR is provided with a front axle connecting-disconnecting mechanism 40 which frees the rotation of the right and left front wheels FR and FL during the two-wheel drive mode which drives the rear wheels RL and RR as driving wheels.

In the transfer mechanism 30, the output of the transmission TM is transmitted to a drive shaft 43 through a HIGH/LOW shifting mechanism 42. This mechanism can change the gear ratio between HIGH and LOW. Furthermore, rotation from drive shaft 43 is input into the center differential gear 44. One output gear of the center differential gear 44 is directly coupled with the output shaft for the rear wheels, while the other output gear is connected to the output shaft for the front wheels through the 2WD/4WD transfer mechanism 46 for transfer between two-wheel drive and four-wheel drive and through a chain 47. The center differential gear 44 is provided with a LOCK/FREE shifting mechanism 48 for stopping the differential operation of the center differential gear 44, that is, for so-called differential lock, by directly coupling the input shaft with the output shaft on the rear wheel side.

The HIGH/LOW shifting mechanism 42 of the transfer mechanism 30 sets the gear ratio of the power train, extending from the transmission TM to the drive shaft 43, to either HIGH or LOW by changing the coupling of the splines on the drive shaft 43 to the splines on the output shaft of the transmission TM, or by changing mating to the splines on the rotating shaft 42b to which the rotation of the transmission TM is transmitted through the speed change mechanism 42a. This change is effected by moving a slider 42s engageable with the splines along the axis of drive shaft 43 indicated by an arrow in FIG. 5. The HIGH/LOW shifting mechanism 42 is designed to change the gear ratio according to an operation command from the driver during four-wheel drive. During two-wheel drive, the gear ratio is locked at HIGH, maximizing fuel economy by preventing reduced fuel economy.

The 2WD/4WD transfer mechanism 46 functions to transfer driving operation and power between two-wheel drive and four-wheel drive by connecting or disconnecting the rotating shaft 46a. The shaft 46a is coupled with the output shaft on the front wheel side and connected to the front propeller shaft or drive shaft 36 through the chain 47 in relation to the rotating shaft 46b of the output gear on the front wheel side of the center differential gear 44. To perform this transfer, the slider 46s, engageable with the splines of the rotating shafts 46a and 46b, is used. Transfer to four-wheel drive is accomplished by mating both splines by moving the slider 46s along the axis of the rotating shaft 46a and 46b indicated by an arrow in FIG. 5. Also transfer to two-wheel drive mode is accomplished by disconnecting the splines by moving the slider 46s.

The LOCK/FREE changeover/shifting mechanism 48 makes a LOCK/FREE changeover/shift of the center differential gear 44 by connecting or disconnecting, through the slider 48s engageable with the splines, the center differential gear 44 input shaft splines in relation to the splines of the output shaft on the rear wheel side connected to the rear drive shaft 32. The LOCK/FREE changeover mechanism locks the center differential gear 44 to allow power transmission to the rear wheels during two-wheel drive, and unlocks the center differential gear 44 during four-wheel drive according to an operation command from the driver.

A front axle connecting-disconnecting mechanism 40 performs connection and disconnection of rotation of the right and left front wheels FL and FR, similar to the above-described transfer mechanism. This is accomplished by connecting and disconnecting, through the slider 40s, the splines of the front drive shafts 38FL and 38FR that drive the right and left front wheels FL and FR, respectively. During two-wheel drive, the splines are disconnected to free the rotation of the right and left front wheels FL and FR. During four-wheel drive, the splines are mated to connect the right and left front wheels FL and FR to the front drive shaft 36 through the front differential gear 37. This disconnection or "freeing" of rotation of the right and left front wheels FL and FR during two-wheel drive aims to prevent a decrease in fuel economy(i.e. maximizes fuel economy) resulting from the rotation of the front drive shafts 38FL and 38FR during two-wheel drive.

The power train of the four-wheel drive vehicle according to the present embodiment is equipped with the front axle connecting-disconnecting mechanism 40, the HIGH/LOW shifting mechanism 42, the 2WD/4WD transfer mechanism 46, and the LOCK/FREE changeover mechanism 48. During operation of these mechanisms, it is necessary to move the sliders 40s, 42s, 46s and 48s along their respective splines to be connected or disconnected.

The slider 42s of the HIGH/LOW shifting mechanism 42 and the slider 46s of the 2WD/4WD transfer mechanism 46 are engaged to a shift fork, not shown, fixed on a fork shaft. Therefore, as the fork shaft moves along the axis indicated by an arrow in FIG. 5, the sliders 42s and 46s also move to set the gear ratio of the power train (ranging from the transmission TM to the drive shaft 43) to either HIGH or LOW. This connects the four-wheel drive by mating the splines of the rotating shafts 46a and 46b or disconnects the two-wheel drive by mating only the rotating shaft 46b splines to disconnect the splines. Accordingly, 2H-4H-N-4L shifting is performed.

In the present embodiment, one thrust actuator driven by a direct current (DC) motor is used for moving the slider for 2H-4H-N-4L shifting. The shifting-transfer mechanism of the present embodiment comprises the thrust actuator mentioned above, a four-channel limit switch for detecting the position of the sliders 42s and 46s as objects moved by the thrust actuator, and a control mechanism for controlling the thrust actuator based on a detection signal from the limit switch.

Figure 2:
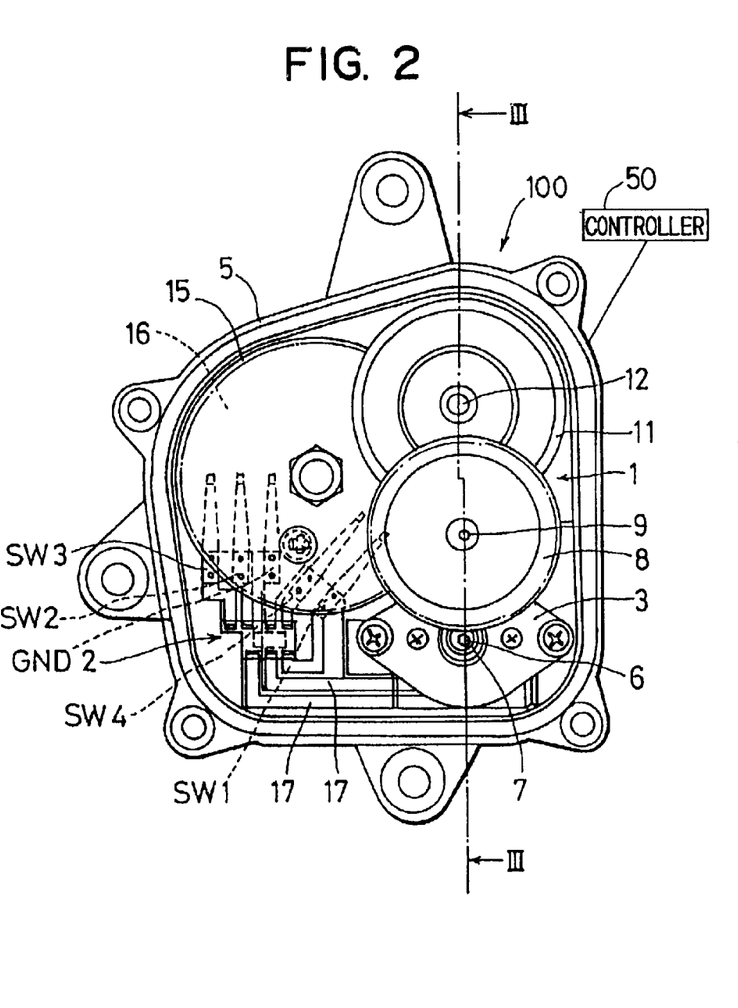
FIG. 2 is a plan view of a shifting transfer mechanism case with its cover removed to reveal the internal structure of a shifting mechanism according to the present invention.

The structure and operation of the shifting-transfer mechanism according to the present embodiment will hereinafter be explained with reference to FIGS. 2 and 3. FIG. 2 is a plan view of the internal structure of the shifting-transfer mechanism 100 with a cover 19 removed. FIG. 3 is a cross-sectional view taken along line III—III of FIG. 2. The shifting-transfer mechanism 100 comprises a thrust actuator 1, a limit switch 2, a case 5 for holding these devices, and a controller 50.

The thrust actuator 1 functions to axially move the fork shaft. The thrust actuator 1 comprises a DC motor 3 (hereinafter referred to simply as the motor) which produces torque, a later-described power transmitting mechanism for transmitting the motor 3 torque, a torsion spring 4 interposed in the power transmitting mechanism, and an output shaft 18 which is rotated on the axis with the torque transmitted from the power transmitting mechanism.

The power transmitting mechanism of the thrust actuator 1 includes a motor pinion 7 mounted on the output shaft 6 of the motor 3. Motor pinion 7 rotates together with the output shaft 6. The transmitting mechanism also includes a gear 8 in mesh with the motor pinion 7; a small-diameter gear 10 supported on a support shaft 9 which commonly supports the gear 8 (rotating together with the gear 8); a large-diameter gear 11 in mesh with the small-diameter gear 10; a plate gear 13 supported on a support shaft 12 which, not commonly supporting the large-diameter gear 11, transmits the torque through the torsion spring 4; a pinion 14 in mesh with the plate gear 13; and a gear 15 in mesh with the pinion 14 and supported on an output shaft 18 together with the switch plate 16 of a later-described limit switch 2.

The torsion spring 4 is installed on the inner periphery of the large-diameter gear 11, with both ends (not shown) retained on a retaining wall protruding on the inside of the large-diameter gear 11. The large-diameter gear 11 has a side wall only on the left side in the axial direction shown in FIG. 3, and is open on the right side.

The plate gear 13, receiving the torque through the torsion spring 4, has a circular plate 13a that closes the open side of the large-diameter gear 11. On the left side surface of the plate 13a shown in FIG. 3, there is provided a circular engaging wall 13b inserted between both ends of the torsion spring 4 on the inner peripheral side of the regaining wall of the large-diameter gear 11. The engaging wall 13b is formed a little shorter in the peripheral direction than the retaining wall of the large-diameter gear 11, so that a slight amount of play is provided in the direction of rotation between both ends of the torsion spring 4.

When the output shaft 18 is locked during operation of the motor 3 to stop the plate gear 13, one end of the torsion spring 4 comes into engagement with one end of the engaging wall 13b of the plate gear 13, while being twisted in the direction of rotation by inertial energy of the rotation of the motor 3 being transmitted through the large-diameter gear 11. As a result, torsional torque, that is, torque supplied through torsion, is stored according to a torsional angle of the spring.

In the thrust actuator 1 thus constructed, the motor 3 is supplied with electric current in a normal or reverse direction through the control mechanism during a 2H-4H-N-4L shift, thus turning the motor 3 in a normal or reverse direction. Also the thrust actuator 1 makes a shift to 2H or 4L in the event of a failure of the switch contact SW1, SW2, SW3 or SW4 of the later-described limit switch 2. This increases the displacement time of the slider 46s or 42s, thus prohibiting a shift to 4H or to N and accordingly ensuring reliable shifting into 2H or 4L. In the following description, the direction of normal rotation of the motor 3 is meant by the direction of rotation the motor 3 turns when a shift is made from 2H to 4H or from 4H to 4L; and the direction of reverse rotation is the direction in which the motor 3 turns when a shift is made from 4H to 2H or from 4L to 4H.

When the motor 3 turns in the normal direction shifting from 2H to 4H or from 4H to 4L, the motor pinion 7 mounted on the output shaft 6 turns as a unit with the output shaft 6, thus turning the gear 8 which is meshed with the motor pinion 7. The rotation of gear 8 is transmitted to the large-diameter gear 11 through the small-diameter gear 10 which is mounted as one body with the gear 8 on the support shaft 9, and is transmitted to the plate gear 13 from the large-diameter gear 11 through the torsion spring 4, and further transmitted from the plate gear 13 to the gear pinion 14 and from the gear pinion 14 to the gear 15. Thereafter, the rotation is further transmitted from the output shaft 18, rotating as one unit with gear 15, to a pinion and rack (both not shown), whereby the rotation is changed into an axial thrust force. Moving the fork shaft by the thrust force thus changed by the rack can move the slider 46s or 42s to the right in FIG. 5 through the shift fork fixed on the fork shaft, thus causing a shift from 2H to 4H or from 4H to 4L.

On the other hand, when the motor 3 turns in the reverse direction when shifting from 4H to 2H or from 4L to 4H, each gear of the power transmitting mechanism rotates in the reverse direction. The reverse rotation is transmitted to the pinion and rack from the output shaft 18 which rotates as one unit with the gear 15. This rotation is changed into an axial thrust force to thereby move the fork shaft. Thus the slider 46s or 42s is moved to the left in FIG. 5 through the shift fork fixed on the fork shaft, making a shift from 4H to 2H or from 4L to 4H.

In the 2H-4H-N-4L shifting stated above, the inertial rotation energy from motor 3 is absorbed by the torsion spring 4, thereby preventing the power transmitting mechanism from receiving, from the output shaft 18, an impact force caused by slider 46s or 42s stopping. When the supply of the electric current to the motor 3 is stopped, the motor 3 is reversed by the torsional torque stored in the torsion spring 4, thereby canceling load likely applied to the power transmitting mechanism.

In the thrust actuator 1 of the present embodiment, the power transmitting mechanism for transmitting the rotation of the motor 3 to the pinion and rack through the output shaft 18 is fitted with the torsion spring 4 for storing the torque. Therefore when an increased load is applied from the slider 46s or 42s side, which is the driven object, the torsion spring 4 stores the torque. The torque thus stored and the motor torque can jointly move the slider 46s or 42s with a greater torque than the motor 3 alone. This enables downsizing of the motor 3 and saving of electric power.

Figure 1:
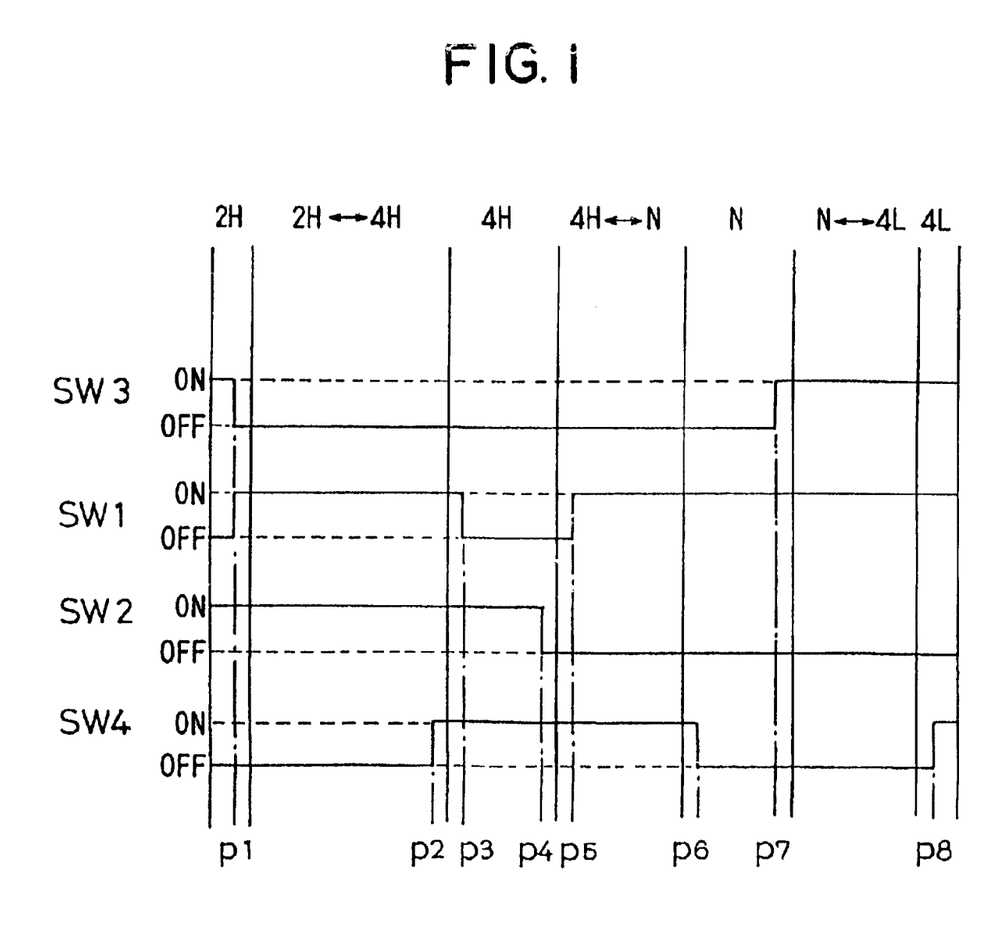
FIG. 1 is a graphical view showing switching characteristics of a limit switch in a 2H-4H-N-4L shifting sequence for a shifting transfer mechanism according to the present invention.

Next, the limit switch 2 will be explained with reference to FIGS. 1, 2 and 4. FIG. 1 is a schematic diagram showing the switching characteristics of the limit switch 2 used in the 2H-4H-N-4L shifting. FIG. 4 is a plan view showing the limit switch 2. In FIG. 4, the terminal plate is now shown for brevity of description. As shown in FIGS. 2 to 4, the limit switch 2 is a four-channel on/off switch, which comprises a switch plate 16, a terminal plate 17, switch contacts SW1, SW2, SW3 and SW4, and a ground GND.

The switch plate 16 is rotatably supported together with the gear 51 on the output shaft 18 of the thrust actuator 1. This plate has, on its surface, conductors 21, 22, 23 and 24 concentrically formed in a circular shape and in different patterns, conductors 21, 22, 23 and 24 inside of the conductor 25, and a conductor 25 concentrically formed in a circular shape. The switch contacts SW1, SW2, SW3 and SW4, and the ground GND are electrically connected to the control mechanism through the terminal plate 17. The switch contacts SW1, SW2, SW3 and SW4 operates independently of each other and is electrically connectable to toe conductors 21, 22, 23 and 24 in accordance with the rotation of the switch plates 16. The ground GND is constantly in electrical connection with the conductor 25. Therefore, the limit switch 2 can send an open-close signal of the switch contacts SW1, SW2, SW3 and SW4 out to the controller 50 according to the 2H-4H-N-4L shifting. Since the open-close signal corresponds to the position of the sliders 46s or 42s, the limit switch 2 can detect the position of the slider 46s or 42s at the time of the 2H-4H-N-4L shifting.

The limit switch 2, as shown in FIG. 1, makes in the range of 2H engagement the on-off operation of the switch contacts SW3 and SW1 with the movement of the slider 46s to the position P1. In this case, switching patterns and on/off patterns of the switch contacts SW1 and SW3 are different from each other. For instance, the switch SW1 changes from an off state to an on state and the switch SW3 changes from an on state to an off state. Therefore the switching patterns provided by the switches SW1 and SW3 are different about directions of switching at the position P1. In the range of non-engagement between 2H and 4H, when the slider 46s moves to the position P2, the switch contact SW4 is actuated to make an on-off operation. In the range of 4H engagement, when the slider 46s moves to the position P3, the switch contact SW1 makes an on-off operation; and when the slider 46s moves to the position P4, the switch contact SW2 makes an on-off operation. In the former case, switching patterns and on/off patterns of the switch contacts SW1 and SW4 are different from each other. For instance, the switch SW1 changes from an on state to an off state and the switch SW4 changes from an off state to an on state. Additionally, timings of switching the switches SW1 and SW4 are slightly apart from each other. Therefore, the switching patterns provided by the switches SW1 and SW4 are different about not only the directions of switching but also the timings of switching when the slider 46s comes into the 4H engagement from the non-engagement range between 2H and 4H. The switching patterns are also different when the slider 46s comes into the non-engagement range between 2H and 4H from the 4H engagement range.

Furthermore, in the range of non-engagement between 4H and N, when the slider 42s moves to the position P5, the limit switch 2 operates to make an on-off operation of the switch contact SW1. In this case, switching patterns and on/off patterns of the switch SW1 and SW2 are different from each other. For instance, the switch SW1 and SW2 are different from each other. For instance, the switch SW1 changes from an off state to an on state and the switch SW2 changes from an on state to an off state. Additionally, timings of switching the switches SW1 and SW2 are slightly apart from each other. Therefore, the switching patterns provided by the switches SW1 and SW2 are different about not only the directions of switching but also the timings of switching when the sliders 46s and 42s come into the non-engagement range between 4H and n from the 4H engagement range. The switching patterns are also different when the sliders 46s and 42s come into the 4H engagement range from the non-engagement range between 4H an n. In the range of N engagement, when the slider 42s moves to the position P6, the switch contact SW4 makes an on-off operation; and when the slider 42s moves to the position P7, the switch contact SW3 makes an on-off operation. Further in the range of 4L engagement, when the slider 42s moves to the position P8, the switch contact SW4 makes an on-off operation.

The switch contacts SW1, SW2, SW3 and SW4, as described above, can independently detect the position of the sliders 42s and 46s which are moved by the thrust actuator 1, between the range of 2H engagement and the range of 4L engagement. The switch contacts SW1, SW2, SW3 and SW4 make the first and second position detecting switches.

In the range of 2H engagement, the range of non-engagement between 2H and 4H, the range of N engagement, and the range of 4L engagement, the switch contacts SW3 and SW4 can separately detect the position of the slider 42s which is moved by the thrust actuator 1. The switch contacts SW3 and SW4 constitute the third and fourth position detecting switches.

Furthermore, the controller 50 has a means for determining a failure of the switch contacts SW1, SW2, SW3 and SW4 comparing the actual switching condition and the switching condition predicted from the history of operation of these switch contacts. The controller 50, therefore, can pinpoint a faulty switch contact in case of a failure of the switch contacts SW1, SW2, SW3 and SW4.

To prevent a fall into the range of N engagement resulting from a failure to detect the range of 4H engagement, two switch contacts independently operate to detect the position of the slider 42s when switching from 2H to 4H. Moreover, on/off patterns of the switch contacts are set differently. This makes it possible to detect a failure of the switch contact even when one of the switch contacts becomes faulty in compliance with the on/off patterns of the remaining non-faulty switch contacts.

Furthermore, even if the two switch contacts have on- or off-failures at the same time, continuous driving of the actuator resulting from a failure of position detection due to a switch contact failure can be prevented. This is because of on/off patterns of any one of the switch contacts when both of them have failures at the same time. At the same time, on/off patterns of the other switch contact do not change, therefore, occurrence of the failures can be determined. By controlling the actuator to move to a further position due to simultaneous on- or off-failures, controlling the vehicle in the best manner and preventing difficult vehicle operation/control can be prevented.

In this embodiment, the controller 50 has a means for storing predetermined switching patterns that indicate the directions of switching and the timings of switching at a shifting operation between two ranges. The stored switching patterns indicate the timings of switching and the directions of switching of the switches under normal condition in accordance with shifting directions. The timing of switching may be stored as order of switching. For example, when the range is shifted from the non-engagement range between 2H and 4H to the 4H engagement range, the switch SW4 switches first, then the switch SW1 follows. The controller 50 further has a means for determining a malfunction of the switches by comparing actual switching patterns detected on the signals output from the switches and the stored switching patterns. For example, when the range is shifted from the non-engagement range between 2H and 4H to the 4H engagement range, the controller 50 may detect a malfunction based on the timings of switching and the directions of switching. If the switch SW1 is not able to properly switch and keeps the on state when the slider 46s moves beyond the position P3, the controller 50 first detects switching of the switch SW4 and identifies possible change of the switch SW1. The controller 50 can detect a malfunction of the switch SW1 because a switching of the switch SW1 is not detected within a predetermined time or predetermined rotation of the motor after a switching of the switch SW4 is detected.

The controller 50 may have a means for retrying a shifting operation when a malfunction is once detected. In this retrying operation, the shifting direction is once reversed to at least a former range, then, the shifting direction is reversed again to the direction in which the malfunction is detected. This operation may restore the switch SW1 and avoid a detection of a temporary malfunction. The controller 50 may have a means for outputting a signal indicative of the malfunction for an external device such as a warning lamp, when the malfunction is again detected on the retrying operation. The controller 50 may repeat the retrying operation several times.

In one embodiment of the present invention heretofore explained, the switch contacts SW1 and SW2 detect the position of the slider 42s which is moved by the thrust actuator 1, during a shifting from the range of 4H engagement to the range of N engagement. Therefore, if one of the switch contacts SW1 and SW2 becomes faulty, the other of the switch contacts SW1 and SW2 detects a shifting between 4H and N. This prevents shifting into N over 4H, thereby preventing malfunction of the thrust actuator 1 resulting from a faulty switch contact SW1 or SW2, while also avoiding the possibility of a vehicle becoming difficult to control.

Furthermore, in the present embodiment, the range of transfer is classified into the range of 2H engagement, the range of non-engagement between 2H and 4H, the range of 4H engagement, the range of non-engagement between 4H and N, the range of N engagement; the range of non-engagement between N and 4L, and the range of 4L engagement. These ranges indicate the position of the slider 46s or 42s which is moved by the thrust actuator 1. It is, therefore, possible to determine the presence or absence of a failure with the switch contacts SW1, SW2, SW3 and SW4 by confirming the sequence of detection of the switch contacts SW1, SW2, SW3 and SW4.

Furthermore, in the present embodiment, the control mechanism, which decides the failure of the switch contacts SW1, SW2, SW3 and SW4, can pinpoint a faulty position detecting switch. Therefore, it is possible to take an emergency measure by performing a 2H-4H-N-4L shift while disregarding a potential faulty switch contact.

Continuing, in the present embodiment, the thrust actuator 1 performs a shifting to 2H or to 4L in case of a failure of the switch contact SW1, SW2, SW3 or SW4, to thereby increase the time for moving the slider 46s or 42s. This, in turn, prohibits a shifting to 4H or to N and also reliably performs a shift to 2H or to 4L. Therefore, even during a limit switch 2 failure, the motor vehicle can be kept running with improved driving safety and under ensured control.

In one embodiment of the present invention described above, one example of the switching characteristics of the limit switch 2 in the 2H-4H-N-4L shifting has been explained with reference to FIG. 1. In the present invention, any switching characteristics may be sufficient if it is possible to detect, by at least two switch contacts, the position of the slider which is moved by the actuator during a shifting from the range of 4H engagement to the range of N engagement.

For instance, in one aspect of the invention (see FIG. 1), one switch such as SW1 signals the actuator to stop at a first position in the 4H range at P3, after 2H is shifted into 4H. Likewise, a second switch, such as SW2, signals the actuator to stop at a second position in 4H at P4, where P4 is different and later than stopped for P3. The first switch SW1 (or a third switch) can then signal the actuator to reverse if 4H is shifted to N at P5 to ensure that the actuator is stopped in the event that SW1 fails and the actuator continues going forward and entering N or 4L.

Although the switches change potential level of output signals between an on and an off state, e.g. zero volts and five (5) volts, the switches may be arranged to provide switch patterns in which potential levels are changed between a high potential level and a low potential level, e.g. one (1) volt and five (5) volts.

The transmission TM may be provided by an automatic type transmission with a torque converter. The transmission TM may be provided by a shift type transmission with a clutch, e.g. a manual type transmission, or a shift-by-wire type transmission in which the gears and the clutch are operated by electrically controlled actuators. The shifting-transfer mechanism disclosed as the embodiment may be applied for the actuator for the shift-by-wire type transmission.

Figure 6A:
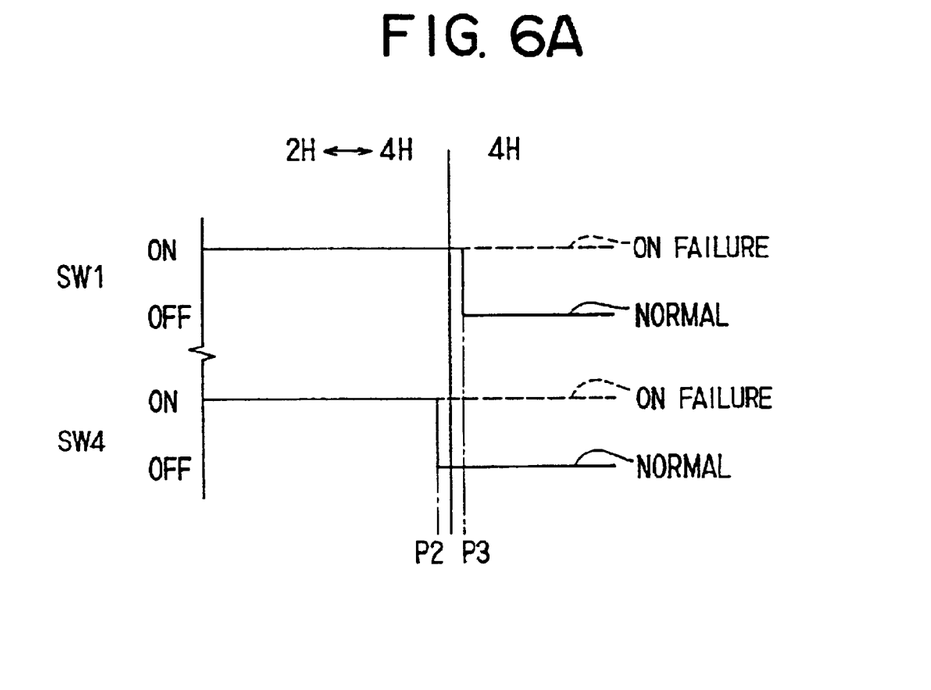
FIG. 6A is a graphical view showing a switching pattern of a position detecting switch having a simultaneous on-failure in comparison to the present invention.
Figure 6B:
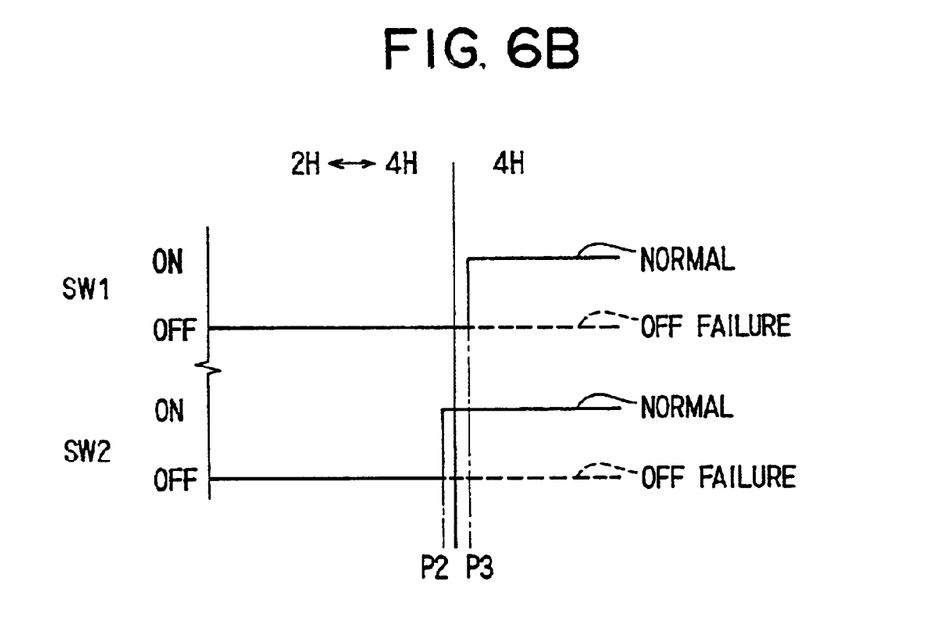
FIG. 6B is a graphical view showing a switching pattern of a position detecting switch having a simultaneous off-failure in comparison to the present invention.

FIGS. 6A and 6B illustrate switching patterns of two different position detecting switches in comparison to the present invention and highlight the advantages of the present invention. In the case of the contact-type position detecting switches utilizing these switching patterns to detect the position, if at least one of the position detecting switches is in normal operation, position detection is still possible at P2 or P3 by the non-faulty switch. However, if those switches have the same switching patterns, for example, switching from on to off as shown in FIG. 6A, the failure of those switches may not be detectable when both of them have on-failures at the same time.

If those position detecting switches have switching patterns which are switching from off to on, as shown in FIG. 6B, and those position detecting switches have off-failures at the same time, failures of those position detecting switches may not be detectable.

As described above, if the position is not detectable, it may fall into N or 4L, resulting in decreased vehicle control. Embodiments of the present invention improve vehicle control by precisely controlling the position detecting switches.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shifting-transfer mechanism used in a vehicle with a part-time four-wheel drive system, the vehicle being equipped with a power transmitting means driven by an internal-combustion engine, wherein the 2WD high speed, 4WD high speed, neutral position, and 4WD low speed are arranged in order, the shifting-transfer mechanism comprising:

an actuator for moving a drive object into connection with an output shaft of the power transmitting means;

a first position detecting switch for detecting the position of the drive object within one of a range of engagement or non-engagement of the 2WD high speed, the 4WD high speed, the neutral position, or the 4WD low speed;

a second position detecting switch operating independently of the first position detecting switch, for detecting a position of the drive object within one of the range of engagement or non-engagement of the 2WD high speed, the 4WD high speed, the neutral position, or the 4WD low speed;

a third position detecting switch operating independently of the first and the second position detecting switches, for detecting a position of the drive object within one of the range of engagement or non-engagement of the 2WD high speed, the 4WD high speed, the neutral position, or the 4WD low speed; and a fourth position detecting switch operating independently of the first, the second, and the third position detecting switches, for detecting a position of the drive object within one of the range of engagement or non-engagement of the 2WD high speed, the 4WD high speed, the neutral position, or the 4WD low speed, wherein:

switching patterns of two of said position detecting switches within one of the range of engagement of the 2WD high speed, non-engagement between the 2WD high speed and the 4WD high speed, engagement of the 4WD high speed, non-engagement between the 4WD high speed and the neutral position, engagement of the neutral position, non-engagement between the neutral position and the 4WD low speed, or engagement of the 4WD low speed are utilized for detecting the position of the drive object; and two position detecting switches are simultaneously changed to different positions in at least one of the ranges of engagement.

2. A shifting-transfer mechanism as claimed in claim 1, wherein two position detecting switches which are utilized for detecting the position of the drive object are selected so that the pattern of the two switches exists in only one of the range of engagements and non-engagements.

3. A shifting-transfer mechanism as claimed in claim 1, further comprising means for determining a malfunction of one of the first, second, third and fourth position detecting switches by comparing an actual switching condition of the first, second, third and fourth position detecting switches and an estimated switching condition of the first, second, third and fourth position detecting switches based on a performance history of the switches.

4. A shifting-transfer mechanism as claimed in claim 1, wherein:

the changing pattern of two position detecting switches is a pattern of the first position detecting switch and the third position detecting switch in a range where the engagement of the 2WD high speed is changed to the non-engagement between the 2WD high speed and the 4WD high speed; and the first position detecting switch is turned from OFF to ON and the third position detecting switch is turned from ON to OFF.

5. A shifting-transfer mechanism used in a part time-system four-wheel drive vehicle, said vehicle, being equipped with a power transmitting device driven by an internal-combustion engine, said shifting-transfer mechanism for shifting to 2WD high speed, 4WD high speed, neutral speed, and 4WD low speed, the shifting-transfer mechanism comprising:

an actuator that moves a drive object into connection with an output shaft of the power transmitting device;

a first position detecting switch that instructs the actuator to stop driving said drive object at a first position in 4H when 2H is shifted into 4H;

a second switch that instructs the actuator to stop driving said drive object at a second position in 4H when 2H is shifted into 4H, said second position being later in a forward direction than said first position;

said first position detecting switch instructing said actuator to reverse drive said drive object at a third position between 4H and N.

6. A method for shifting a shifting-transfer mechanism used in a part time-system four-wheel drive vehicle, said vehicle being equipped with a power transmitting device driven by an internal-combustion engine, said shifting-transfer mechanism having an actuator that moves a drive object into connection with an output shaft of the power transmitting device for shifting to 2WD high speed, 4WD high speed, neutral speed, and 4WD low speed, the method comprising the steps of:

instructing the actuator to stop driving said drive object at a first position in 4H when 2H is shifted into 4H;

instructing the actuator to stop driving said drive object at a second position in 4H when 2H is shifted into 4H, said second position being later in a forward direction that said first position;

instructing said actuator to reverse drive said drive object at a third position between 4H and N.

* * * * *